(12) United States Patent
Kachmar et al.

(10) Patent No.: US 10,860,488 B1
(45) Date of Patent: Dec. 8, 2020

(54) DYNAMIC ENABLING OF METADATA PREFETCH INTO CACHE

(71) Applicant: EMC IP HOLDING COMPANY LLC, Hopkinton, MA (US)

(72) Inventors: Maher Kachmar, Marlborough, MA (US); Philippe Armangau, Acton, MA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/527,572

(22) Filed: Jul. 31, 2019

(51) Int. Cl.
*G06F 12/08* (2016.01)
*G06F 12/0862* (2016.01)
*G06N 20/00* (2019.01)
*G06F 16/172* (2019.01)

(52) U.S. Cl.
CPC ........ *G06F 12/0862* (2013.01); *G06F 16/172* (2019.01); *G06N 20/00* (2019.01); *G06F 2212/602* (2013.01)

(58) Field of Classification Search
CPC .......... G06F 12/0862; G06F 2212/602; G06F 16/172; G06N 20/00
See application file for complete search history.

(56) References Cited

U.S. PATENT DOCUMENTS

| 10,095,624 | B1* | 10/2018 | Visvanathan | ....... | G06F 12/0868 |
| 10,496,290 | B1* | 12/2019 | Visvanathan | ....... | G06F 12/0871 |
| 2004/0117556 | A1* | 6/2004 | Kadi | ....... | G06F 9/383 |
| | | | | | 711/137 |
| 2013/0080812 | A1* | 3/2013 | Shirota | ....... | G06F 12/0862 |
| | | | | | 713/324 |
| 2014/0229682 | A1* | 8/2014 | Poremba | ....... | G06F 12/0862 |
| | | | | | 711/137 |
| 2015/0032967 | A1* | 1/2015 | Udayashankar | .... | G06F 12/0862 |
| | | | | | 711/137 |
| 2015/0378919 | A1* | 12/2015 | Anantaraman | ..... | G06F 12/0897 |
| | | | | | 711/122 |
| 2016/0034023 | A1* | 2/2016 | Arora | ....... | G06F 1/3206 |
| | | | | | 711/137 |
| 2017/0017562 | A1* | 1/2017 | Gulkis | ....... | G06F 11/3612 |
| 2018/0239705 | A1* | 8/2018 | Heirman | ....... | G06F 9/30181 |
| 2019/0065376 | A1* | 2/2019 | Lee | ....... | G06F 12/0855 |

* cited by examiner

*Primary Examiner* — Hiep T Nguyen
(74) *Attorney, Agent, or Firm* — Daly, Crowley Mofford & Durkee, LLP

(57) ABSTRACT

A method is provided for use in a storage system to dynamically disable and enable prefetching, comprising: defining a first plurality of time windows; calculating a first plurality of weights; identifying a first plurality of values of a cache metric; calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

20 Claims, 7 Drawing Sheets

| DATA TYPE | CACHE HIT RATE | TIMESTAMP | |
|---|---|---|---|
| USER DATA STORED IN LU 102-1 | 50% | $T_1$ | 410 |
| USER DATA STORED IN LU 102-2 | 40% | $T_1$ | 410 |
| I-NODE METADATA | 45% | $T_1$ | 410 |
| DIRECTORY METADATA | 50% | $T_1$ | 410 |
| INDIRECT MAPPING METADATA | 40% | $T_1$ | 410 |
| USER DATA STORED IN LU 102-1 | 43% | $T_2$ | 410 |
| USER DATA STORED IN LU 102-2 | 51% | $T_2$ | 410 |
| I-NODE METADATA | 44% | $T_2$ | 410 |
| DIRECTORY METADATA | 49% | $T_2$ | 410 |
| INDIRECT MAPPING METADATA | 42% | $T_2$ | 410 |
| ... | ... | ... | |
| USER DATA STORED IN LU 102-1 | 42% | $T_N$ | 410 |
| USER DATA STORED IN LU 102-2 | 52% | $T_N$ | 410 |
| I-NODE METADATA | 43% | $T_N$ | 410 |
| DIRECTORY METADATA | 47% | $T_N$ | 410 |
| INDIRECT MAPPING METADATA | 48% | $T_N$ | 410 |

| TYPE | PREFETCHING ENABLED? | |
|---|---|---|
| I-NODE METADATA | YES | 510-1 |
| DIRECTORY METADATA | NO | 510-2 |
| USER DATA STORED IN LU 102-1 | NO | 510-3 |
| USER DATA STORED IN LU 102-2 | YES | 510-4 |
| ● ● ● | ● ● ● | |
| INDIRECT MAPPING METADATA | YES | 510-M |

DYNAMIC ENABLING OF METADATA PREFETCH INTO CACHE

BACKGROUND

A distributed storage system may include a plurality of storage devices (e.g., storage arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided for use in a storage system, comprising: defining a first plurality of time windows, the first plurality of time windows including a current time window and one or more past time windows; calculating a first plurality of weights, each of the first plurality of weights corresponding to a different one of the first plurality of time windows; identifying a first plurality of values of a cache metric, wherein each of the first plurality of values of the cache metric corresponds to a different one of the first plurality of time windows; calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

According to aspects of the disclosure, a storage system is disclosed, comprising: a memory; and one or more processors operatively coupled to the memory, the one or more processors being configured to perform the operations of: defining a first plurality of time windows, the first plurality of time windows including a current time window and one or more past time windows; calculating a first plurality of weights, each of the first plurality of weights corresponding to a different one of the first plurality of time windows; identifying a first plurality of values of a cache metric, wherein each of the first plurality of values of the cache metric corresponds to a different one of the first plurality of time windows; calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

According to aspects of the disclosure, a non-transitory computer-readable medium is disclosed that stores one or more processor-executable instructions, which when executed by one or more processors, cause the one or more processors to perform the operations of: defining a first plurality of time windows, the first plurality of time windows including a current time window and one or more past time windows; calculating a first plurality of weights, each of the first plurality of weights corresponding to a different one of the first plurality of time windows; identifying a first plurality of values of a cache metric, wherein each of the first plurality of values of the cache metric corresponds to a different one of the first plurality of time windows; calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 4 is a diagram of an example of a cache metric log, according to aspects of the disclosure;

FIG. 5 is a diagram of an example of a prefetch configuration table, according to aspects of the disclosure;

DETAILED DESCRIPTION

Before describing embodiments of the concepts, structures, and techniques sought to be protected herein, some terms are explained. In some embodiments, the term "I/O request" or simply "I/O" may be used to refer to an input or output request. In some embodiments, an I/O request may refer to a data read or write request.

Figure 1:
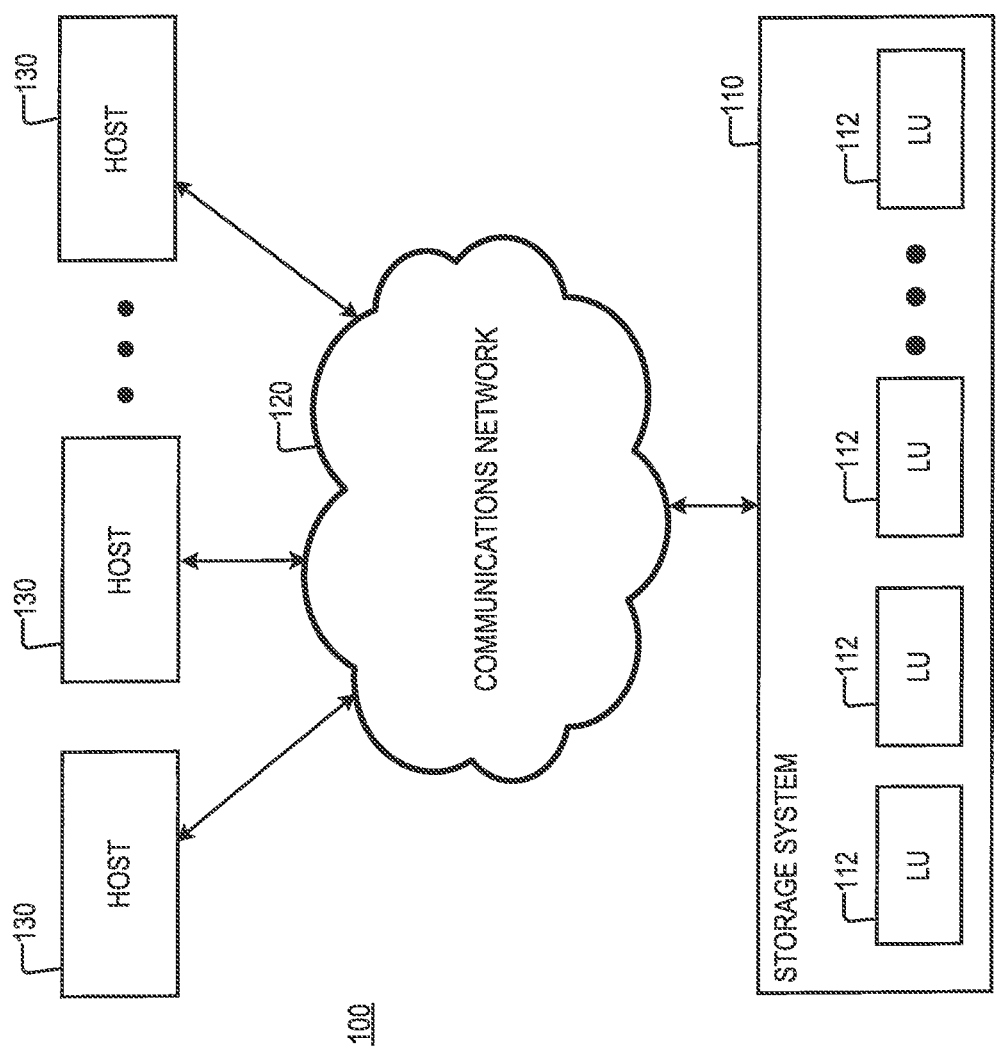
FIG. 1 is a diagram of an example of a system, according to aspects of the disclosure.

FIG. 1 is a diagram of an example of a system 100, according to aspects of the disclosure. The system 100 may include a storage system 110 that is coupled to one or more host devices 120 via a communications network 130. The communications network 130 may include a local area network (LAN), a wide area network (WAN), the Internet, and/or any or suitable type of communications network. Each of the host devices 120 may include a desktop computer, a laptop computer, a smartphone, a digital media player, and/or any other suitable type of electronic device. The storage system 110 may include a midrange storage system, an enterprise storage system, and/or any other suitable type of storage system. The storage system 110 may be configured to store at least two types of data—namely, user data and metadata. The user data may include any data one would normally store in a storage system, such as media, documents, etc. The metadata may include any suitable type of data that describes how user data is stored in the storage system 110. Examples of metadata include i-node metadata, directory metadata, metadata that maps (directly or indirectly) logical addresses to physical ones, etc. The storage system 110 may also implement a plurality of logical units (LUs) 112, as shown. In some implementations, each of the LUs 112 may be associated with one or more of the host devices 120. In such implementations, only host devices 120 that are associated with any given one of the LUs 112 may be permitted to access data that is stored on that LU 112. As used throughout the disclosure, the term "data" may refer to at least one (or both) of "user data" and "metadata."

In some implementations, the storage system 110 may dynamically disable or enable the prefetching of some types of metadata (and/or user data) into cache. For example, the storage system 110 may dynamically disable the prefetching of i-node metadata while continuing to prefetch directory metadata. Furthermore, in some implementations, the storage system 110 may dynamically disable or enable the prefetching of user data into to cache. For example, the storage system 110 may dynamically disable user data that is stored in one of the LUs 112 while continuing to prefetch into cache user data that is stored in another one of the LUs 112. In some respects, the capability to disable the prefetching of only some types data may be advantageous because it allows the storage system 110 conserve system resources without experiencing a greater decrease in performance that might occur if the prefetching of all data stored in the storage system 110 is stopped.

Additionally or alternatively, in some implementations, the prefetching of some types of data may be dynamically disabled or enabled at runtime of the storage system 110. In such implementations, concurrently with the servicing of incoming read or write requests, the storage system 110 may repeatedly assess and reassess whether the prefetching of certain types of metadata or user data need to be enabled (or disabled), and act accordingly. In some respects, the capability to dynamically disable or enable the prefetching of certain types of data is advantageous because it allows the storage system 110 to adapt more closely to changing operational conditions.

Figure 2:
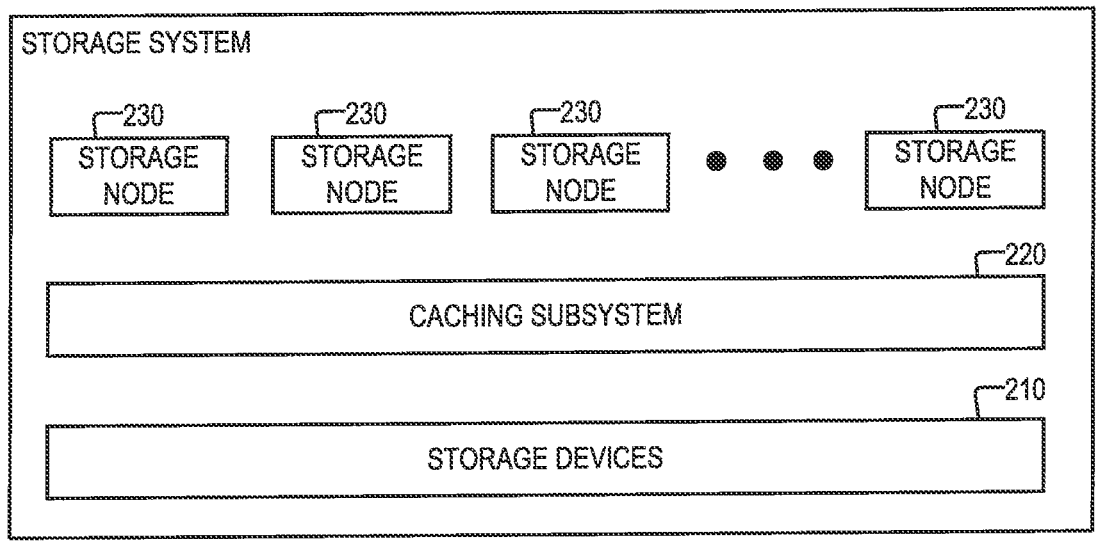
FIG. 2 is a diagram of a storage system that is part of the system of FIG. 1, according to aspects of the disclosure.

FIG. 2 is a diagram of the storage system 110, according to aspects of the disclosure. As illustrated, the storage system 110 may include one or more storage devices 210, a caching subsystem 220, and a plurality of storage nodes 230. The storage devices 210 may include one or more of a non-volatile Random-Access Memory (nvRAM), a Solid State Drive (SSD), a Hard Drive, a flash memory, and/or any other suitable type of storage device. The caching subsystem 220 may be configured to implement a cache of the storage system 110 that is used to service read requests that are received at the storage system 110. Any of the storage nodes 230 may be configured to service incoming read requests by retrieving requested data from the storage devices 210 (and/or the cache of the storage system 110) and returning the retrieved data to the host device 120. According to the present example, the caching subsystem 220 is executed on a computing device, such as the computing device 900 (shown in FIG. 9). However, alternative implementations are possible in which the caching subsystem 220 is executed on multiple computing devices. According to the present example, the caching subsystem 220 and the storage nodes 230 are executed on different computing devices. However, alternative implementations are possible in which the caching subsystem 220 is executed on one or more computing devices that are also used to execute the storage nodes 230. According to the present example, each storage node 230 is implemented by using a different computing device, alternative implementations are possible in which two or more of the storage nodes 230 are implemented on the same computing device. According to the present example, the storage system 110 includes multiple storage devices 210. However, alternative implementations are possible in which the storage system 110 includes only one storage device. Stated succinctly, the present disclosure is not limited to any specific architecture for the caching subsystem 220 and/or the storage system 110.

Figure 3:
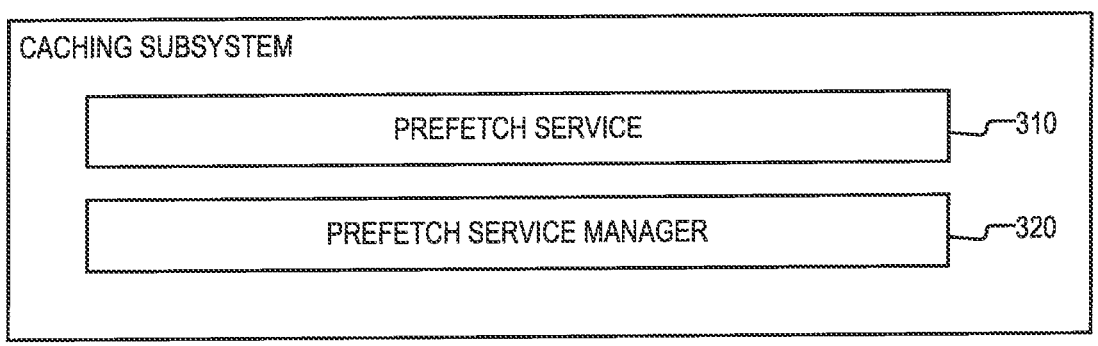
FIG. 3 is a diagram of an example of a caching subsystem that is part of the storage system of FIG. 2, according to aspects of the disclosure.

FIG. 3 is a diagram of the caching subsystem 220, according to aspects of the disclosure. As illustrated, the caching subsystem 220 may include a prefetch service 310 and a prefetch service manager 320. The prefetch service 310 may include one or more processes that are configured to prefetch data stored on the storage devices 210 into the cache of the storage system 110. The prefetch service manager 320 may include one or more processes that are configured to enable and/or disable the prefetching of certain types of data. Specifically, for any type of data that is stored in the storage system 110, the prefetch service manager 320 may: (i) detect whether prefetching of the type of data needs to be disabled, and (ii) disable the prefetching of the type of data in response to detecting that the prefetching of the type of data needs to be disabled. Furthermore, for any type of data that is stored in the storage system 110, the prefetch service manager 320 may: (i) detect whether prefetching of the type of data needs to be enabled, and (ii) enable the prefetching of the type of data in response to detecting that the prefetching of the type of data needs to be enabled. The operation of the prefetch service manager 320 is discussed further below with respect to FIGS. 4-9. In some implementations, the term "prefetch" may refer to the loading of data into the cache of the storage system 110 without there being a pending read request for the data that is received at the storage system 110, and before the arrival of a new request for the data.

FIG. 3 is provided as an example only. Although FIG. 3 shows the caching subsystem 220 as including a prefetch service and a prefetch service manager only, those of ordinary skill in the art would readily recognize that the caching subsystem 220 may include other services, such as a cache metric logging service, a service that loads data into cache when a read request for the data is received, a garbage collector, etc. Although FIG. 3 depicts the prefetch service 310 and the prefetch service manager 320 as separate entities, it will be understood that alternative implementations are possible in which the prefetch service 310 and the prefetch service manager 320 are integrated together. Although in the present example each of the prefetch service 310 and the prefetch service manager 320 is implemented in software, alternative implementations are possible in which any of the prefetch service 310 and the prefetch service manager 320 is implemented in hardware or as a combination of hardware and software. Stated succinctly, the present disclosure is not limited to any specific implementation of the caching subsystem 220.

FIG. 4 shows an example of a cache metric log 400. The cache metric log 400 may be stored in a memory of the storage system 110 (e.g., in the memory of one or more computing devices that are used to implement the caching subsystem 220). The cache metric log may be maintained by the caching subsystem 220 and/or any other component of the storage system 110. The cache metric log 400 may include a plurality of entries 410. Each entry 410 may identify the cache hit rate of the storage system 110 (or portion thereof) at a specific time instant (or during a specific sampling period). Furthermore, each entry 410 may identify the cache hit rate of the storage system 110 with respect to a specific type of metadata (or user data). As a result, the cache metric log 400 may provide a high level of granularity with respect to the cache hits/misses that are generated when a given type of metadata or user data is attempted to be read from the storage system 110. As is discussed further below, the data in the cache metric log can be aggregated by the prefetch service manager 320 to calculate the average hit of rate of the storage system 110 (with respect to a particular type of metadata/user data) during each of a plurality of time windows 610 (shown in FIG. 6A). Although in the example of FIG. 4 the cache metric log 400 includes values of cache hit rate, alternative implementations are possible in which the cache metric log 400 includes the values of another cache metric, such as a cache miss rate, a cache utilization rate, and/or any other suitable metric that identifies one or more characteristics of the operation of the cache of the storage system 110.

FIG. 5 shows an example of a prefetch configuration table 500, according to aspects of the disclosure. The prefetch configuration table 500 may be stored in a memory of the storage system 110 (e.g., in the memory of one or more computing devices that are used to implement the caching subsystem 220). The prefetch configuration table 500 may include a plurality of entries 510. Each entry 510 may include a respective data type identifier 512 and respective flag 514; the respective flag 514 indicates whether prefetching is enabled of the type of data that is identified by the respective data type identifier 512. According to the present example, the entry 510-1 indicates that prefetching of i-node metadata is enabled; the entry 510-2 indicates that prefetching for directory metadata is disabled; the entry 510-3 indicates that prefetching for data stored in the LU 120-1 is disabled; the entry 510-4 indicates that prefetching of data stored in the LU 120-2 is enabled; and the entry 510-M indicates that prefetching of indirect mapping metadata is enabled, wherein N is an integer greater than 4. In operation, the prefetch service 310 may examine the prefetch configuration table 500 to identify the types of data whose prefetching is enabled, and subsequently prefetch only those types of data. For instance, when the prefetch configuration table 500 is arranged as shown in FIG. 5, the prefetch service 310 may prefetch i-node metadata, indirect mapping metadata, and user data that that is stored in LU 102-2, while abstaining from prefetching directory metadata and user data stored in LU 102-1.

The operation of the prefetch service manager 320 is now described in further detail. In operation, the prefetch service manager 320 may select a type of data (e.g., a given type of metadata, such as i-node metadata, or a given type of user data, such as data stored in LU 112-2). Next, the prefetch service manager 320 may identify a plurality of time windows 610 (shown in FIG. 6A). The plurality of time windows may include a current time window 612 and one or more past time windows 614. According to the present example, the plurality of time windows 610 includes a past time window 614-1 and a past time window 614-N, where N is an integer greater than or equal to 2.

Figure 6A:
FIG. 6A is a diagram illustrating a plurality of time windows, according to aspects of the disclosure.
Figure 6B:
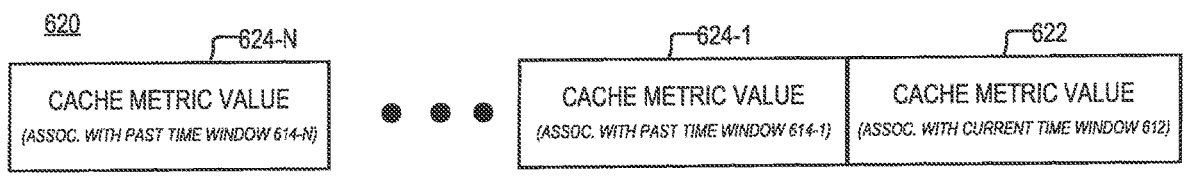
FIG. 6B is a diagram illustrating a plurality of cache metric values that is associated with the plurality of time windows of FIG. 6A, according to aspects of the disclosure.

Next, the prefetch service manager 320 may identify a plurality of cache metric values 620 for the selected type of data (shown in FIG. 6B). According to the present example, each of the values in the plurality 620 identifies the average cache hit rate of the storage system 110 (of the selected type of data) during a different respective one of the plurality of time windows 610. Each of the values in the plurality 620 may be generated by aggregating data stored in the cache metric log 400 and/or in any other suitable manner. According to the present example, cache metric value 622 is the average cache hit rate of the selected type of data during the current time window 612; cache metric value 624-1 is the average cache hit rate of the selected type of data during the past time window 614-1; and cache metric value 624-N is the average cash hit rate of the selected type of data during the past time window 614-N. Although in the present example the plurality 620 includes cache hit rate values, alternative implementations are possible in which the plurality 620 includes the values of another type of cache metric (e.g., cache miss rate, etc.).

Figure 6C:
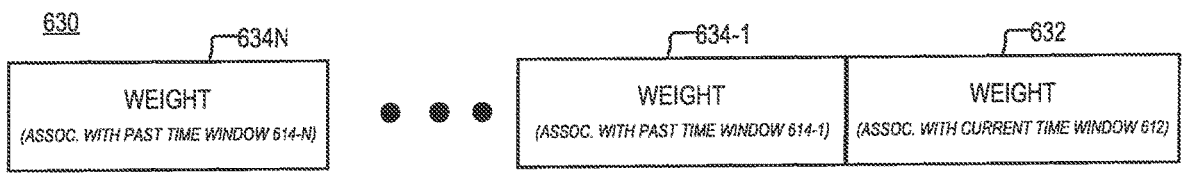
FIG. 6C is a diagram illustrating a plurality of weights that is associated with the plurality of time windows of FIG. 6A, according to aspects of the disclosure.

Next, the prefetch service manager 320 may identify a plurality of weights 630 (shown in FIG. 6C). Each of the plurality of weights 630 may correspond to a different one of the plurality of time windows 610. According to the present example, the plurality of weights 630 includes a weight 632 that corresponds to the current time window 612, a weight 634-1 that corresponds to the past time window 614-1, and a weight 634-N that corresponds to the past time window 614-N. As discussed further below with respect to FIG. 8, in some implementations, the plurality of weights 630 may be generated by using a machine learning engine. However, it will be understood that the present disclosure is not limited to any specific method for generating the plurality of weights 630.

Next, the prefetch service manager 320 may generate a prefetch score based on the plurality of cache metric values 620 and the plurality of weights 630. In some implementations, the prefetch score may be equal to (or otherwise based on) the weighted average of the plurality of cache metric values 620, as weighted by the plurality of weights 630. Additionally or alternatively, in some implementations, the weighted average may be calculated based on Equation 1 below:

$$\text{prefetch score} = \frac{\sum_{i=1}^{N} weight_i * cm_i}{\sum_{i=1}^{N} cm_i} \quad \text{(Eq. 1)}$$

where, $weight_i$ is the weight corresponding to (time window)$_i$, $cm_i$ is a cache metric value for the selected type data during (time window)$_i$, and (time window)$_i$ is the i-th time window in the plurality 610 (either the current time window 612 or one of the plurality of past time windows 614).

Next, the prefetch service manager 320 may determine whether the prefetch score meets a predetermined threshold. If the threshold is met, and prefetching of the selected type of data is currently disabled, the prefetch service manager 320 may enable the prefetching of the selected type of data. On the other hand, if the threshold is not met, and prefetching of the selected type of data is currently enabled, the prefetch service manager 320 may disable the prefetching of the selected type of data. If the threshold is not met and prefetching of the selected type of data is disabled, the prefetch service manager 320 may do nothing. Similarly, if the threshold is met and prefetching of the selected type of data is currently enabled, the prefetch service manager 320 may also do nothing. In some implementations, the threshold may be met when the prefetch score is greater than or equal to the threshold and not met when the prefetch score is less than the threshold. Alternatively, in some implementations, the threshold may be met when the prefetch score is greater than the threshold and not met when the score is less than or equal to the threshold. Stated succinctly, the present disclosure is not limited to any specific method for comparing the prefetch score to a threshold.

In some implementations, enabling prefetching of the selected data type may include identifying an entry 510 in the prefetch configuration table 500 that corresponds to the selected data type and changing the value of the flag 514 in the identified entry 510 to indicate that prefetching of the selected data type is currently enabled. In some implementations, disabling prefetching of the selected data type may include identifying an entry 510 in the prefetch configuration table 500 that corresponds to the selected data type and changing the value of the flag 514 in the identified entry 510 to indicate that prefetching of the selected data type is currently disabled.

In some implementations, the current time window 612 may include a time period that starts in the past and extends into the present. As such, the current time window 612 may lack a fixed duration. By contrast, each of the past time windows may start in the past and end in the past. According to the present example, the past time windows 614 have the same duration. However, alternative implementations are possible, in which two or more of the past time windows 614 have different durations. Furthermore, according to the present example, the time windows in the plurality 600 are contiguous. However, alternative implementations are possible in which the time windows are non-contiguous.

Although in the present example cache hit rate is used to calculate the prefetch score, alternative implementations are possible in which another type of cache metric is used, such as cache miss rate, etc. Although in the present example, each of the plurality of cache metric values 620 is an average value, alternative implementations are possible in which each of the values is a median (e.g., the median of the cache hit rates for the selected data type that are measured during a respective time window) or a sum (e.g., the sum of a the cache hit rates for the selected data type that are measured during a respective time window). Stated succinctly, the present disclosure is not limited to any specific type of value being included in the plurality 620.

Figure 7:
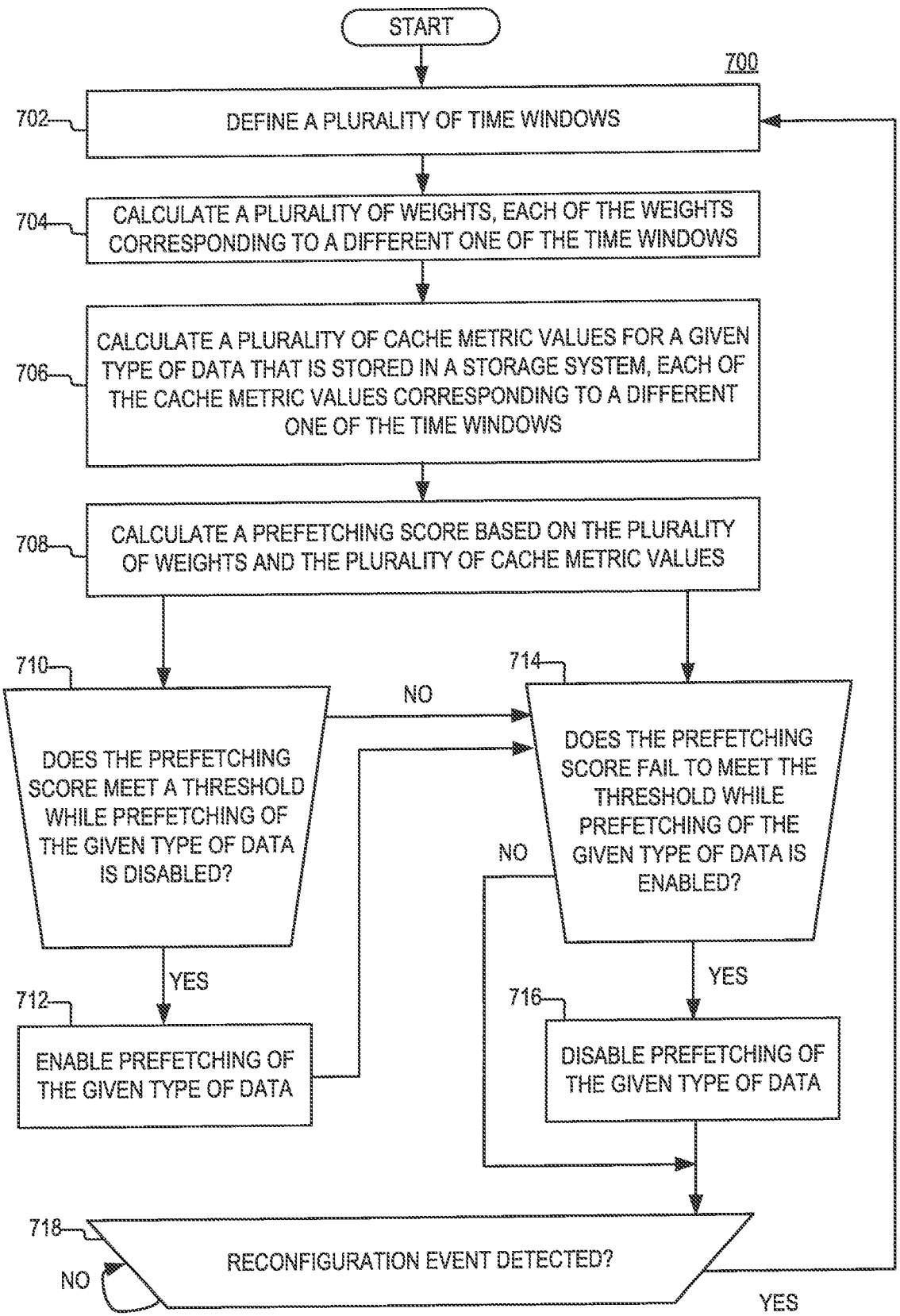
FIG. 7 is a flowchart of an example of a process according to aspects of the disclosure, according to aspects of the disclosure.

FIG. 7 is a flowchart of an example of a process 700, according to aspects of the disclosure. According to the present example, the process 700 is performed by the prefetch service manager 320. However, alternative implementations are possible in which the process 700 is performed by any other component of the storage system 110.

At step 702, the prefetch service manager 320 defines a plurality of time windows. According to the present example, the plurality of time windows may include a current time window and one or more past time windows. By way of example, defining the plurality of time windows may include one or more of: (i) identifying a starting time for the current time window, (ii) identifying a count of past time windows that are to be included in the plurality, (iii) identifying a duration of any of the past time windows, (iv) identifying a starting time of any of the plurality of past time windows, (v) identifying an end time of any of the past time windows. In some implementations, the plurality of time windows may be the same or similar to the plurality 610, which is discussed above with respect to FIG. 6A.

At step 704, a plurality of weights is calculated by the prefetch service manager 320. Each of the plurality of weights may correspond to a different one of the plurality of time windows. In some implementations, as discussed further below with respect to FIG. 8, the plurality of weights may be generated by using a machine learning engine. In some implementations, the plurality of weights may be the same or similar to the plurality 630, which is discussed above with respect to FIG. 6C.

At step 706, a plurality of values of a cache metric is calculated by the prefetch service manager 320. The cache metric may include cache hit rate associated with a given type of data that is stored in the storage system 110. The given type of data may include either user data or metadata. Each of the plurality of cache metric values may correspond to a different one of the plurality time windows, and as such it may reflect the number (or average rate) of cache hits that were recorded in that time window when the given type of data is attempted to be retrieved from cache. Each of the plurality of cache metric values may be calculated based on the information that is stored in the cache metric log 400. In some implementations, the plurality of cache metric values may be the same or similar to the plurality 620, which is discussed above with respect to FIG. 6B.

At step 708, a prefetch score for the given type of data is calculated by the prefetch service manager 320. The prefetch score may be calculated based on the plurality of weights and a plurality of cache metric values. Additionally or alternatively, in some implementations, the prefetching score may be based on a weighted average of the plurality of cache metric values (obtained at step 706) that is generated by using the plurality of weights (obtained at step 704). Additionally or alternatively, in some implementations, the prefetch score may calculated based on Equation 1.

At step 710, the prefetch service manager determines: (i) whether the prefetch score meets a threshold, and (ii) whether prefetching of the given type of data is currently disabled. If the prefetch score meets the threshold while prefetching of the given data type is disabled, the process 700 proceeds to step 712. Otherwise, the process 700 proceeds to step 714.

At step 712, prefetching of the given type of data is enabled by the prefetch service manager 320. Enabling prefetching of the given data type may include: (i) identifying an entry 510 in the prefetch configuration table 500 that corresponds to the given data type and modifying the flag 514 in the identified entry to indicate that prefetching of the given type of data is enabled.

At step 714, the prefetch service manager determines: (i) whether the prefetch score fails to meet the threshold, and (ii) whether prefetching of the given type of data is currently enabled. If the prefetch score meets the threshold while prefetching of the given data type is disabled, the process 700 proceeds to step 716. Otherwise, the process 700 proceeds to step 718.

At step 716, prefetching of the given type of data is disabled by the prefetch service manager 320. Disabling prefetching of the given data type may include: (i) identifying an entry 510 in the prefetch configuration table 500 that corresponds to the given data type and modifying the flag 514 in the identified entry to indicate that prefetching of the given type of data is disabled.

At step 718, the prefetch service manager 320 determines whether a reconfiguration event is detected. If the reconfiguration event is detected, the process 700 returns to step 702 and the process 700 is executed again. As noted above, in some implementations, the process 700 may be executed at runtime of the storage system 110. In some implementations, the reconfiguration event may include the expiration of a timer. In such implementations, the process 700 may be executed periodically (e.g., every 1 hour). Additionally or alternatively, in some implementations, the reconfiguration event may be generated when a load metric of the storage system 110 exceeds or falls below a threshold. By way of example, the load metric may include input/output operations per second (IOPS) of the storage system, current bandwidth consumption of the storage system 110, and/or any other suitable type of load metric.

According to aspects of the disclosure, the process 700 may be performed for each (or at least some) of the different types of metadata that are stored in the storage system 110 (and/or identified in the cache metric log 400). In this way, the prefetching of different types of metadata may be dynamically enabled and/or disabled as needed to improve the performance of the storage system 110. Additionally or alternatively, in some implementations, the process 700 may be performed for each (or at least some) of the different types of user data that are stored in the storage system 110 (and/or identified in the cache metric log 400). In this way, the prefetching of different types of user data may be dynamically enabled and/or disabled as needed to improve the performance of the storage system 110. According to the present example, data is classified into types based on the LU 112 where the data is stored. Thus, data stored in LU 112-1 may be considered first type of data, whereas data stored in LU 112-2 may be considered second type of data. However, it will be understood that the present disclosure is not limited to any specific classification of the data. For example, in some implementations, data may be classified into types based on ownership, such that data that is owned by one entity is considered first type of data, whereas data that is owned by another entity is considered second type of data.

According to the present example, the plurality of time windows is redefined with each iteration of the process 700. As a result, any two interactions of the process 700 may use pluralities of time windows that differ from one another. Although in the present example the plurality of time windows is redefined with each iteration of the process 700, alternative implementations are possible in which the plurality of time windows is not redefined, such that the same plurality of time windows is used with each iteration. Although in the process 700, cache hit rate is used to calculate the prefetch score, alternative implementations are possible in which another type of cache metric is used (e.g., cache miss rate, etc.).

Figure 8:
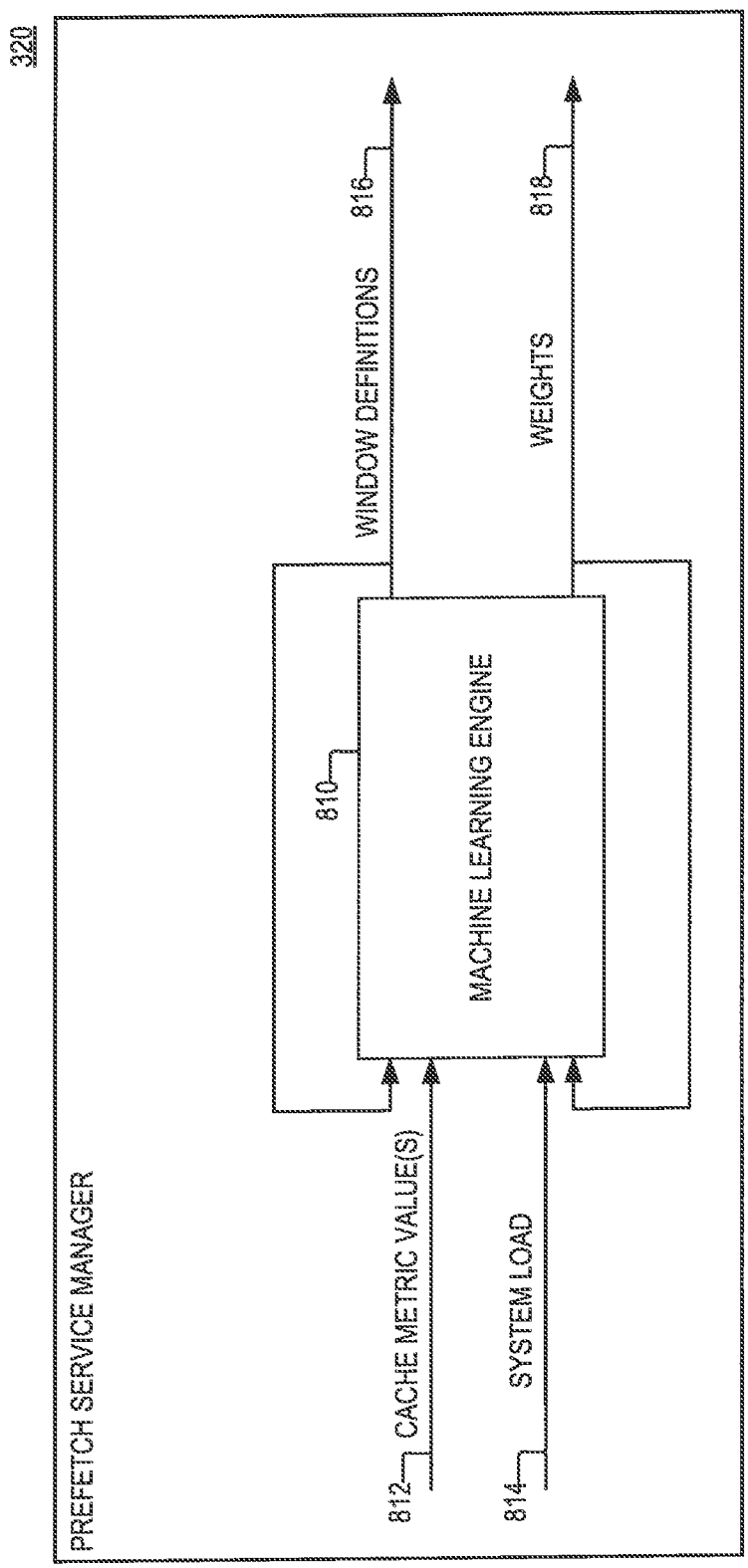
FIG. 8 is a diagram illustrating the operation of a prefetch service manager that is part of the caching subsystem of FIG. 3, according to aspects of the disclosure.

FIG. 8 is a schematic diagram illustrating the operation of the prefetch service manager 320 in further detail. As illustrated, the prefetch service manager 320 may be configured to execute a machine learning engine 810. The machine learning engine may implement any suitable type of online machine learning algorithm, such as Least Absolute Shrinkage and Selection Operator (LASSO), Stochastic Gradient Descent, Progressive Learning, or online convex optimization, for example. In operation, the machine learning engine 810 may receive as input: (i) a set 812 of values of a cache metric for a given type of data, and (ii) an indication of system load 814, (iii) a set of time window definitions that has been generated by the machine learning engine 810 at an earlier time instant, and (iv) a set of weights that has been generated by the machine learning engine 810 at an earlier time instant. Based on this input, the machine learning engine may generate at least one of a new set of time window definitions 816, and/or a new set of weights 818. In some implementations, the machine learning engine 810 may be configured to generate the new set of weights and/or time window definitions so as to reduce the amount of prefetching that is performed by the storage system 110, while also minimizing the increase in cache misses that would be experienced by the storage system 110 as a result of the prefetching of some types of data being disabled. Additionally or alternatively, in some implementations, the machine learning engine may be further configured to detect changes in workload phase of the storage system 110 and adjust the weights of past and current windows based on the change of workload phase.

According to the present example, the set 812 of cache metric values identify the respective average cache hit rate of the storage system 110, with respect to a selected data type, during each of the time windows specified by the time window definitions 816. However, alternative implementations are possible in which the values of any other suitable type of cache metric (e.g., cache miss rate) are used instead. The indication of a system load 814 may identify any suitable type of characteristic of the operation of the storage system 110. For example, in some implementations, the indication of system load may identify current IOPS of the storage system 110 or current bandwidth consumptions of the storage system 110.

Figure 9:
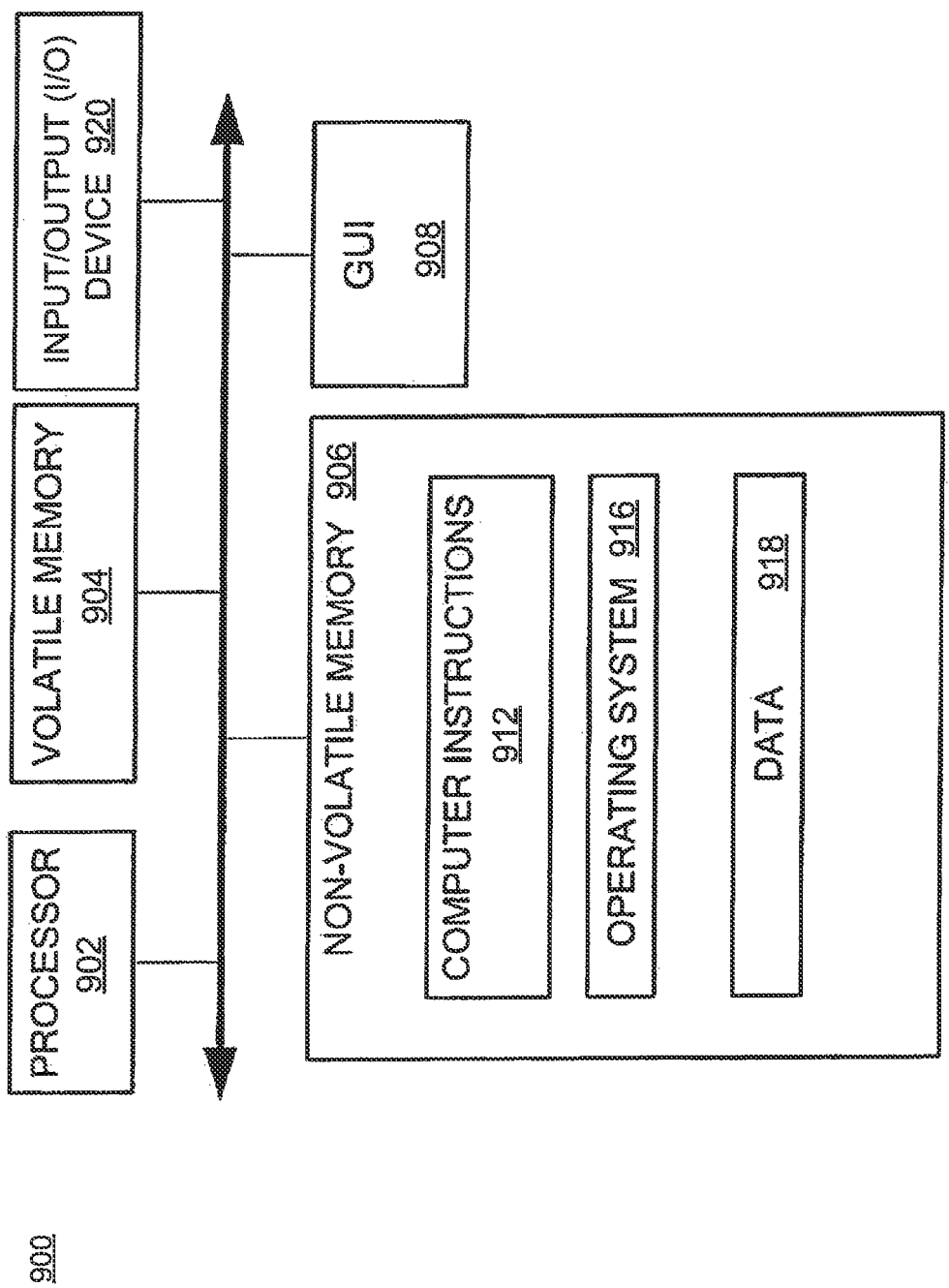
FIG. 9 is a diagram of an example of a computing device, according to aspects of the disclosure.

Referring to FIG. 9, in some implementations, any of the caching subsystem 220 and the storage nodes 230 may be implemented as one or more computing devices 900. Each computing device 900 may include processor 902, volatile memory 904 (e.g., RAM), non-volatile memory 906 (e.g., a hard disk drive, a solid state drive such as a flash drive, a hybrid magnetic and solid state drive, etc.), graphical user interface (GUI) 908 (e.g., a touchscreen, a display, and so forth) and input/output (I/O) device 920 (e.g., a mouse, a keyboard, etc.). Non-volatile memory 906 stores computer instructions 912, an operating system 916 and data 918 such that, for example, the computer instructions 912 are executed by the processor 902 out of volatile memory 904 to perform at least a portion of the process 700 and/or any other function of the storage system 110.

FIGS. 1-9 are provided as an example only. At least some of the steps discussed with respect to FIGS. 1-9 may be performed in parallel, in a different order, or altogether omitted. As used in the context of "set function," "wait function," and "release function," the term "function" may refer to one or more processor-executable instructions are configured to perform an operation. Although in one example, the "set function," "wait function," and "release function" may be implemented in software, it will be understood that alternative implementations are possible in which any of these functions may be performed in hardware or as a combination of software and hardware.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method for use in a storage system, comprising:
defining a first plurality of time windows, the first plurality of time windows including a current time window and one or more past time windows;
calculating a first plurality of weights, each of the first plurality of weights corresponding to a different one of the first plurality of time windows;
identifying a first plurality of values of a cache metric, wherein each of the first plurality of values of the cache metric corresponds to a different one of the first plurality of time windows;
calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

2. The method of claim 1, wherein the prefetching of the first type of data is stopped by modifying a data structure that is stored in a memory of the storage system, the data structure being modified to indicate that the prefetching of the first type of data is disabled.

3. The method of claim 1, wherein the first type of data includes a first type of metadata that is used by the storage system for storing user data, and the second type of data includes a second type of metadata that is used by the storage system for storing user data.

4. The method of claim 1, wherein the first type of data includes user data that is stored in a first logic unit (LU) of the storage system and the second type of data includes user data that is stored in a second LU of the storage system.

5. The method of claim 1, wherein the first plurality of weights is generated by using an online machine learning engine that is configured to balance: (i) reductions in prefetching that is performed by the storage system with (ii) an increase in cache misses that occur in the storage system as a result of the reductions in prefetching, the online machine learning engine being executed by the storage system concurrently with a servicing of incoming Input/Output (I/O) requests by the storage system.

6. The method of claim 1, further comprising recalculating the prefetch score for the first type of data and resuming the prefetching of the first type of data when the recalculated prefetch score for the first type of data meets the threshold, the prefetch score being recalculated at runtime of the storage system.

7. The method of claim 6, further comprising:
defining a second plurality of time windows;
calculating a second plurality of weights, each of the second plurality of weights corresponding to a different one of the second plurality of time windows;
identifying a second plurality of values of a cache metric, wherein each of the second plurality of values of the cache metric corresponds to a different one of the second plurality of time windows,
wherein the prefetch score is recalculated based on the second plurality of weights and the second plurality of caching metric values.

8. A storage system comprising:
a memory; and
one or more processors operatively coupled to the memory, the one or more processors being configured to perform the operations of:
defining a first plurality of time windows, the first plurality of time windows including a current time window and one or more past time windows;
calculating a first plurality of weights, each of the first plurality of weights corresponding to a different one of the first plurality of time windows;
identifying a first plurality of values of a cache metric, wherein each of the first plurality of values of the cache metric corresponds to a different one of the first plurality of time windows;
calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and
when the prefetch score fails to meet a threshold, stopping prefetching of the first type of data, while continuing to prefetch a second type of data.

9. The storage system of claim 8, wherein:
the memory is configured to store a data structure including a plurality of entries, each entry including a respective identifier corresponding to a different respective type of data that is stored in the storage system and a respective indication of whether prefetching of the respective type of data is enabled,
the prefetching of the first type of data is stopped by modifying the data structure to indicate that the prefetching of the first type of data is disabled.

10. The storage system of claim 8, wherein the first type of data includes a first type of metadata that is used by the storage system for storing user data, and the second type of data includes a second type of metadata that is used by the storage system for storing user data.

11. The storage system of claim 8, wherein the first type of data includes user data that is stored in a first logic unit (LU) of the storage system and the second type of data includes user data that is stored in a second LU of the storage system.

12. The storage system of claim 8, wherein the first plurality of weights is generated by using an online machine learning engine that is configured to balance: (i) reductions in prefetching that is performed by the storage system with (ii) an increase in cache misses that occur in the storage system as a result of the reductions in prefetching, the online machine learning engine being executed by the storage system concurrently with a servicing of incoming Input/Output (I/O) requests by the storage system.

13. The storage system of claim 8, wherein the one or more processors are further configured to perform the operations of:
recalculating the prefetch score for the first type of data; and
resuming the prefetching of the first type of data when the recalculated prefetch score for the first type of data meets the threshold, the prefetch score being recalculated at runtime of the storage system.

14. The storage system of claim 13, wherein:
the one or more processors are further configured to perform the operations of: defining a second plurality of time windows, calculating a second plurality of weights, each of the second plurality of weights corresponding to a different one of the second plurality of time windows, identifying a second plurality of values of a cache metric; and
the prefetch score is recalculated based on the second plurality of weights and the second plurality of caching metric values.

15. A non-transitory computer-readable medium storing one or more processor-executable instructions, which when executed by one or more processors, cause the one or more processors to perform the operations of:
defining a first plurality of time windows, the first plurality of time windows including a current time window and one or more past time windows;
calculating a first plurality of weights, each of the first plurality of weights corresponding to a different one of the first plurality of time windows;
identifying a first plurality of values of a cache metric, wherein each of the first plurality of values of the cache metric corresponds to a different one of the first plurality of time windows;

calculating a prefetch score for a first type of data based on the first plurality of weights and the first plurality of caching metric values, the prefetch score being calculated by weighing each of the cache metric values based on a respective one of the first plurality of weights that corresponds to a same time window as the cache metric value; and when the prefetch score fails to meet a threshold, stopping prefetching of the first type of data, while continuing to prefetch a second type of data.

16. The non-transitory computer-readable medium of claim 15, wherein the prefetching of the first type of data is stopped by modifying a data structure to indicate that the prefetching of the first type of data is disabled.

17. The non-transitory computer-readable medium of claim 15, wherein the first type of data includes a first type of metadata that is used by a storage system for storing user data, and the second type of data includes a second type of metadata that is used by the storage system for storing user data.

18. The non-transitory computer-readable medium of claim 15, wherein the first type of data includes user data that is stored in a first logic unit (LU) of a storage system and the second type of data includes user data that is stored in a second LU of the storage system.

19. The non-transitory computer-readable medium of claim 15, wherein the first plurality of weights is generated by using an online machine learning engine that is configured to balance: (i) reductions in prefetching that is performed by a storage system with (ii) an increase in cache misses that occur in the storage system as a result of the reductions in prefetching.

20. The non-transitory computer-readable medium of claim 15, wherein the processor-executable instructions, when executed by the one or more processors, further cause the one or more processors to prefetch score for the first type of data and resuming the prefetching of the first type of data when the recalculated prefetch score for the first type of data meets the threshold, the prefetch score being recalculated at runtime of a storage system.

* * * * *